(12) United States Patent
Zhang

(10) Patent No.: US 10,554,851 B2
(45) Date of Patent: Feb. 4, 2020

(54) METHOD FOR DETERMINING WHETHER PRINTED ENCODING INFORMATION IS NOT FALSIFIED

(71) Applicant: Dande Image Master Co., Ltd., Zhuhai, Zhuhai, Guangdong (CN)

(72) Inventor: Lianjie Zhang, Guangdong (CN)

(73) Assignee: Dande Image Master Co., Ltd., Zhuhai, Zhuhai (CN)

( * ) Notice: Subject to any disclaimer, the term of this patent is extended or adjusted under 35 U.S.C. 154(b) by 45 days.

(21) Appl. No.: 15/723,213

(22) Filed: Oct. 3, 2017

(65) Prior Publication Data

US 2018/0268271 A1 Sep. 20, 2018

(30) Foreign Application Priority Data

Mar. 14, 2017 (CN) .......................... 2017 1 0148674

(51) Int. Cl.
*H04N 1/32* (2006.01)
*G06K 19/06* (2006.01)
*G06K 7/14* (2006.01)

(52) U.S. Cl.
CPC ....... *H04N 1/32197* (2013.01); *G06K 7/1404* (2013.01); *G06K 7/1447* (2013.01); *G06K 19/06037* (2013.01); *H04N 1/32299* (2013.01); *H04N 1/32304* (2013.01); *H04N 2201/327* (2013.01)

(58) Field of Classification Search
None
See application file for complete search history.

(56) References Cited

U.S. PATENT DOCUMENTS

| | | | | |
|---|---|---|---|---|
| 6,757,407 B2* | 6/2004 | Bruckstein | .............. | G06T 1/005 380/54 |
| 7,386,729 B2* | 6/2008 | Lee | ........................ | G06T 1/0064 375/E7.089 |
| 2014/0093120 A1* | 4/2014 | Reed | ....................... | G06T 1/0021 382/100 |
| 2015/0055855 A1* | 2/2015 | Rodriguez | .............. | G06F 21/16 382/159 |

OTHER PUBLICATIONS

Liu et al., Marking and detection of text documents using transform domain techniques, Apr. 8, 1999, SPIE, p. 317-328.*

* cited by examiner

*Primary Examiner* — Barbara D Reinier

(57) ABSTRACT

Related are a method and system for embedding information into encoding information. The method comprises the steps of first embedding the information into an embeddable image or a virtual image using a frequency domain embedding method, and then overlaying the embeddable image or the virtual image into a printed file in need of a variable code or a fixed code using a spatial domain processing method. In this way, the information not perceived by human eyes may be embedded into the encoding information using frequency domain and spatial domain transformation, the counterfeiting difficulty is extremely large, the cost is high, and the anti-counterfeiting purpose is achieved; and furthermore, the printing cost is not increased, thereby being beneficial to wide promotion and application.

5 Claims, 3 Drawing Sheets

METHOD FOR DETERMINING WHETHER PRINTED ENCODING INFORMATION IS NOT FALSIFIED

CROSS-REFERENCE TO PRIOR APPLICATION

The present application claims the benefit of Chinese Patent Application No. 201710148674.X filed on Mar. 14, 2017, the contents of which are incorporated herein by reference.

TECHNICAL FIELD

The disclosure belongs to the technical field of encoding information, and more particularly, relates to a method and system for embedding information into the encoding information.

BACKGROUND

The encoding information such as a barcode and a two-dimensional code is generally printed on a commodity package. One commodity has one code, which may be used in commodity price management/inventory management/inventory-transshipment management and the like of a merchant. In case a code-variable printout is adopted to implement one code for one article, its application scope may be more expanded to prize-giving sales, anti-counterfeiting, tracing, payment, Internet gateway and mobile phone client downloading, etc.

Along with the fusion of an encoding technology and a network technology as well as the encoding technology and a printing technology, a color code, a three-dimensional code and the like may be already seen on a present market and it is believed that more applications will be developed and will become increasingly mature. However, the existing encoding technology is no other than an information technology. Whether or not the encoding rule is disclosed or blocked, what is transmitted is information and data, which may be a webpage, a price and a serial number, etc. For the existing two-dimensional code, in order to use conveniently and read the information, great deals of application software are provided with a port for reading the two-dimensional code, such as QQ, WeChat and other apps. As the making cost of a jump page for the information carried by the two-dimensional code is low, the counterfeiting cost is extremely low. It is no longer news to transfer virus, false information and so on with the two-dimensional code.

SUMMARY

To solve the above technical problems in the related art, the disclosure provides a method that may embed information not perceived by human eyes into encoding information using frequency domain and spatial domain transformation and has large counterfeiting difficulty, high cost and no increased printing cost, and a system for implementing the method for embedding the information into the encoding information.

To solve the above technical problems, the following technical scheme is adopted by the disclosure.

A method for embedding information into encoding information, including: first, the information is embedded into an embeddable image or a virtual image using a frequency domain embedding method; and then, the information is overlaid into a printed file in need of a variable code or a fixed code using a spatial domain processing method.

Further, that "the information is embedded into the embeddable image or the virtual image using the frequency domain embedding method" refers to perform gray processing and frequency domain processing on the virtual image in sequence; that "the information is overlaid into the printed file in need of the variable code or the fixed code using the spatial domain processing method" refers to embed the embedded information into the virtual image that is subjected to the frequency domain processing, perform frequency domain inverse transformation and perform the spatial domain processing to embed into image information that needs to be embedded actually.

Further, the method for embedding the information into the encoding information specifically includes the following steps:

a1, the gray transformation is performed on a Red-Green-Blue (RGB) or Cyan-Magenta-Yellow (CMY) or Cyan-Magenta-Key-Yellow (CMKY) virtual image A to obtain an image G after the gray transformation;

a2, the frequency domain transformation is performed on the image G after the gray transformation to obtain an amplitude ampG;

a3, the embedded information is embedded into the amplitude ampG after the frequency domain transformation according to a rule;

a4, an inverse transformation is performed to obtain a gray image G' of the embedded information, and a difference W' between the G' and the G is calculated;

a5, a two-dimensional code is generated, the two-dimensional code being a black-white two-dimensional code or a color two-dimensional code, and is converted into image information B having a needed resolution; and a6, the spatial domain processing is performed on the difference W' and is embedded into the image information B that needs to be embedded actually to obtain image information B' of the embedded information, and the image information B' is output to a digital printer to print.

Further, that "the embedded information is embedded into the amplitude ampG after the frequency domain transformation according to the rule" is specifically as follows: when the embedded information is m-bit W, and information W (i) at an ith bit is 0 or 1, i=1, 2, . . . , m, each bit of the information W (i) is embedded into the amplitude ampG of the gray image G after the frequency domain transformation according to the following rule:

ampG (i)'=ampG (i)+X, when the W (i) is 1;
ampG (i)'=ampG (i)−X, when the W (i) is 0;
where X is a given positive real number and i is the ith bit of the embedded information;
alternatively,
ampG (i)'=ampG (i)*(1+a), when the W (i) is 1;
ampG (i)'=ampG (i)*(1−a), when the W (i) is 0;
where a is a given positive real number less than 1 and i is the ith bit of the embedded information.

Further, after the embedded information is overlaid into the printed file in need of the variable code or the fixed code using the spatial processing method and is printed out, the embedded information is extracted out from the collected printed encoding information so as to determine whether surface information of the encoding information is dependable.

Further, that "the embedded information is extracted out from the collected printed encoding information so as to determine whether the surface information of the encoding information is dependable" specifically is as follows: first of all, the image information of the printed encoding information is collected, and the gray transformation and the frequency domain transformation are performed on the image information in sequence; and then, the embedded information is extracted from the image information according to a certain rule.

Further, that "the embedded information is extracted out from the collected printed encoding information so as to determine whether the surface information of the encoding information is dependable" specifically includes the following steps:

b1, the image information B2 of the printed encoding information is collected;

b2, the gray transformation is performed on the obtained RGB image information B2 to obtain image information GB2 after the gray transformation;

b3, the frequency domain transformation is performed on the image information GB2 after the gray transformation to obtain an amplitude ampGB2;

b4, the amplitude ampGB2 is compared with an amplitude ampG in a database to obtain embedded information Wx having m bits in total, wherein the information of an ith bit is as follows:

when ampGB2 (i)>ampG (i)>=0, Wx (i)=1;
when ampGB2 (i)>ampG (i)<0, Wx (i)=0;

b5, the embedded information Wx is compared with embedded information W in the database so as to determine whether the surface information of the encoding information is dependable; and b6, two-dimensional code reading is performed on the obtained RGB image information B2 or the image information GB2 after the gray transformation, and a comparison is made with two-dimensional code information in the database so as to determine whether the two-dimensional code information is dependable.

Further, before the gray transformation is performed on the obtained RGB image information B2, the image information B2 is further preprocessed; that is, according to a two-dimensional code of the image information B2, a point is positioned so as to determine a correction parameter and then finish image correction.

Further, a sequence of 0 and 1 for the m bits of the embedded information W is composed of information by direct conversion, or is composed of encrypted and additionally verified codes, or is combined with the two-dimensional code information.

A system for embedding information into encoding information, including a processor, a gray transformation module, configured to perform gray transformation on an RGB or CMY or CMKY virtual image A or RGB image information B2 to obtain an image G or image information GB2 after the gray transformation;

a frequency domain transformation module, configured to perform frequency domain transformation on the image G or the image information GB2 after the gray transformation to obtain an amplitude portion: ampG or ampGB2;

an information embedding module, configured to embed embedded information into the amplitude ampG after the frequency domain transformation according to a rule;

a two-dimensional code image generation module, configured to generate a two-dimensional code for given information, the two-dimensional code being a black-white two-dimensional code or a color two-dimensional code, and convert the two-dimensional code into image information B having a needed resolution;

a spatial domain transformation module, configured to perform frequency domain inverse transformation to obtain an gray image G' of the embedded information, calculate a difference W' between the G' and the G, and perform spatial domain processing on the difference W' to embed into the image information B that needs to be embedded actually to obtain image information B' of the embedded information;

a database, configured to store the embedded information, the information corresponding to the two-dimensional code, and the amplitude ampG of the gray image G after the frequency domain transformation;

an image collection module, configured to collect the image information B2 of the printed encoding information;

an image preprocessing module, configured to preprocess the image information B2 and then finish image correction to obtain a corrected image B2';

an information extracting and checking module, configured to perform information extraction and proofreading on the corrected image information B2', and check with the embedded information in the database;

and a printing device; the gray transformation module, the frequency domain transformation module, the information embedding module, the two-dimensional code image generation module, the spatial domain transformation module, the database, the image collection module, the image preprocessing module, the information extracting and checking module and the printing device all are conducted and are connected with the processor.

The disclosure has the following beneficial effects.

Through the above technical scheme, the information not perceived by the human eyes may be embedded into the encoding information using the frequency domain and spatial domain transformation, the counterfeiting difficulty is extremely large, the cost is high, and the anti-counterfeiting purpose is achieved; and furthermore, the printing cost is not increased, thereby being beneficial to wide promotion and application.

BRIEF DESCRIPTION OF THE DRAWINGS

The disclosure is further described below with reference to accompanying drawings and specific embodiments.

DETAILED DESCRIPTION

In order to make the purpose, technical scheme and advantages of the disclosure more clear, the disclosure will be further described below in detail with reference to accompanying drawings and embodiments. It should be understood that the specific embodiments described here are merely to explain the disclosure and are not intended to limit the disclosure.

Figure 1:
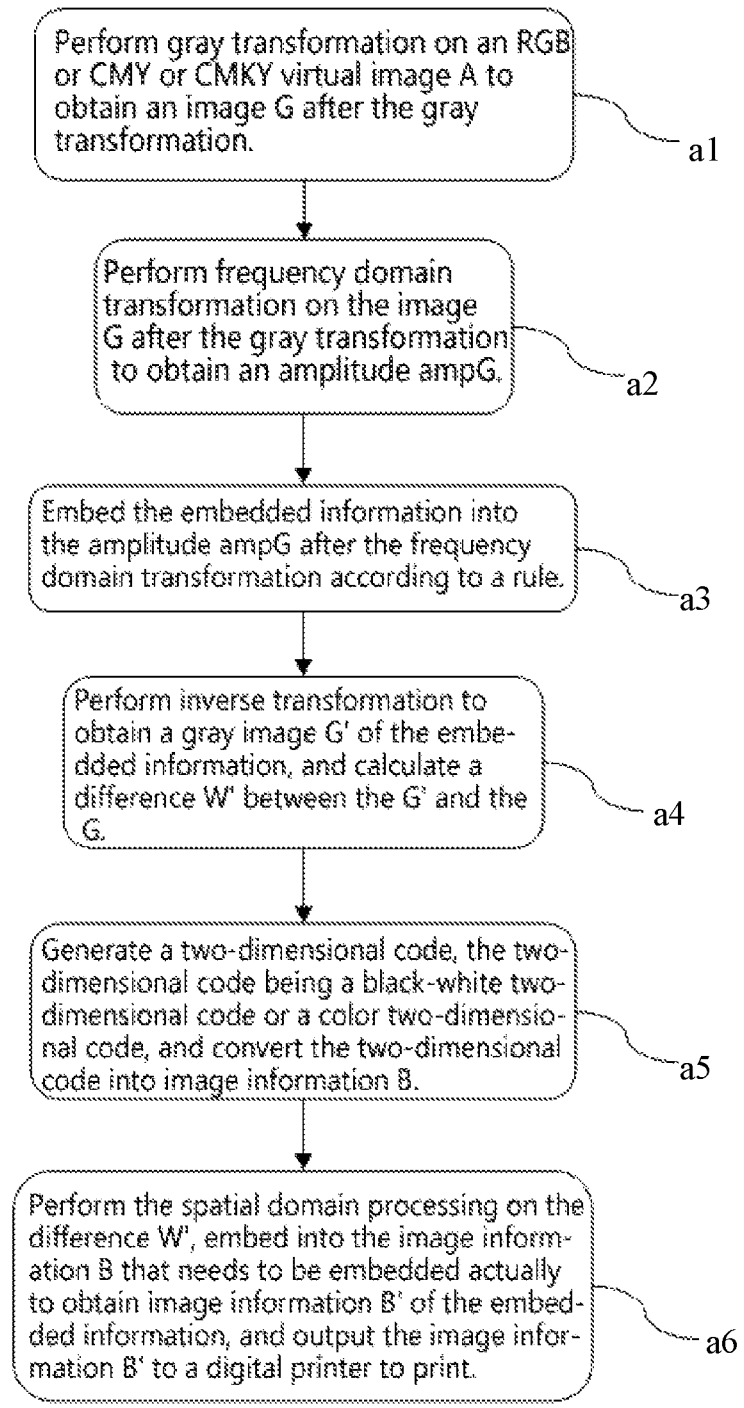
FIG. 1 is a flowchart of an embodiment of a method for embedding information into encoding information of the disclosure.
Figure 2:
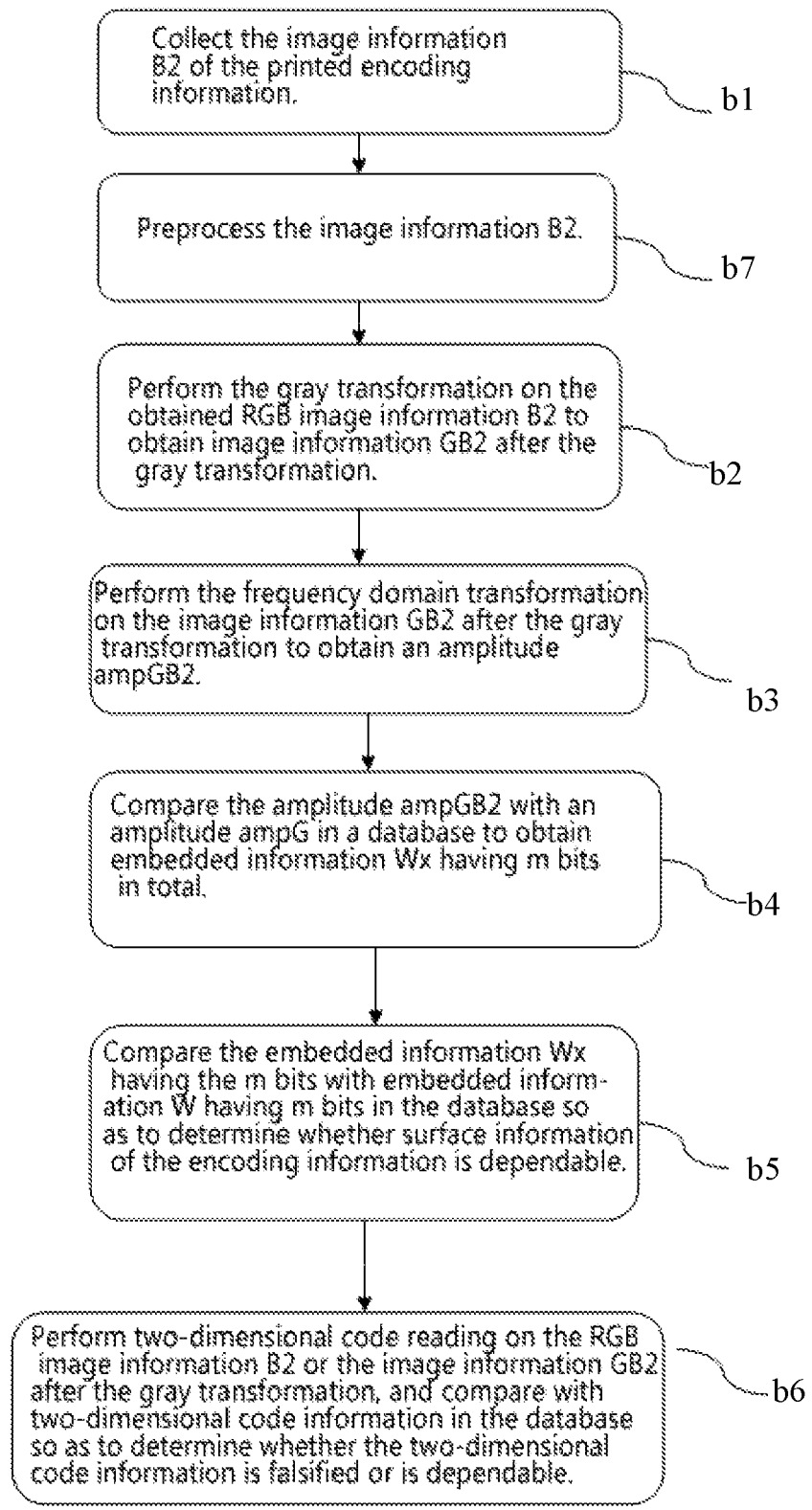
FIG. 2 is a flowchart for extracting embedded information in an embodiment of a method for embedding information into encoding information of the disclosure.

As shown in FIG. 1 and FIG. 2:

The embodiments of the disclosure provide a method for embedding information into encoding information. First, the information is embedded into an embeddable image or a virtual image using a frequency domain embedding method; and then, the information is overlaid into a printed file in need of a variable code or a fixed code using a spatial domain processing method. Wherein, that "the information is embedded into the embeddable image or the virtual image using the frequency domain embedding method" refers to perform gray processing and frequency domain processing on the virtual image in sequence; that "the information is overlaid into the printed file in need of the variable code or the fixed code using the spatial domain processing method" refers to embed the embedded information into the virtual image that is subjected to the frequency domain processing, perform inverse transformation and perform the spatial domain processing to embed into image information that needs to be embedded actually.

The method for embedding the information into the encoding information specifically includes the following steps.

In step a1, the gray transformation is performed on an RGB or CMY or CMKY virtual image A (for example, the gray transformation is performed using a color complementary relationship) to obtain an image G after the gray transformation, such as image $G=0.299R+0.587G+0.114B$.

In step a2, the frequency domain transformation is performed on the image G after the gray transformation (such as Fourier transformation, discrete cosine transformation and the like are adopted) to obtain an amplitude ampG.

In step a3, the embedded information is embedded into the amplitude ampG after the frequency domain transformation according to a rule; for example, when the embedded information is m-bit W, and the embedded information is embedded according to the following rule; that is to say, W (i) is information at an ith bit, and specifically is 0 or 1; when i=1, 2, ..., m, each bit of the information W (i) is embedded into the amplitude ampG of the gray image G after the frequency domain transformation according to the following rule:

ampG (i)'=ampG (i)+X, when the W (i) is 1;
ampG (i)'=ampG (i)−X, when the W (i) is 0;
where X is a given positive real number and i is the ith bit of the embedded information;
alternatively,
ampG (i)'=ampG (i)*(1+a), when the W (i) is 1;
ampG (i)'=ampG (i)*(1−a), when the W (i) is 0;
where a is a given positive real number less than 1 and i is the ith bit of the embedded information.

In step a4, an inverse transformation is performed to obtain a gray image G' of the embedded information, and a difference W' between the G' and the G is calculated.

In step a5, a two-dimensional code is generated, the two-dimensional code being a black-white two-dimensional code or a color two-dimensional code (for example, when an QR code is generated, it is the black-white two-dimensional code, the gray corresponding to the black is 50 and the gray corresponding to the white is 200, etc.), and is converted into image information B having a needed resolution.

In step a6, the spatial domain processing is performed on the difference W' and is embedded into the image information B that needs to be embedded actually to obtain image information B' of the embedded information, and the image information B' is output to a digital printer to print.

Furthermore, a sequence of 0 and 1 for the m bits of the embedded information W is composed of information by direct conversion, or is composed of encrypted or additionally verified codes, or is combined with the two-dimensional code information.

For example:

The sequence of 0 and 1 for the m bits of the embedded information W is composed of the information by the direct conversion: supposing that the embedded information is characters ABC, the W information may be corresponding to 010000010100001001000011. Supposing that the embedded information is a decimal digit 65, the W information may be corresponding to 01000001. During detection, the W information is directly compared with W in the database.

The sequence of 0 and 1 for the m bits of the embedded information W is composed of the additionally verified codes: supposing that the embedded information is the characters ABC, the W information may be corresponding to 010000010100001001000011xxxxxxxx. Supposing that the embedded information is the decimal digit 65, the W information may be corresponding to 01000001yyyy, wherein xxxxxxxx and yyyy are verification information and each bit is the sequence of 0 or 1. During detection, the W information is compared with the W in the database and is further verified or decoded so as to determine whether it is falsified.

The sequence of 0 and 1 for the m bits of the embedded information W is combined with a hash value of the two-dimensional code: supposing the embedded information is the characters ABC, the W information may be corresponding to 010000010100001001000011xxxxxxxxhhhhhhhh; supposing that the embedded information is the decimal digit 65, the W information may be corresponding to 01000001yyyyhhhhhhhh, wherein xxxxxxxx and yyyy are verification information, hhhhhhhh is the hash value of the two-dimensional code and each bit is the sequence of 0 or 1. During detection, the W information is compared with the W in the database and is verified so as to determine whether it is falsified, and then is compared with the hash value of the read two-dimensional code so as to determine whether it has falsification; as a result, the security is improved.

Wherein, the bit length of the verified codes x and y and the hash value h may be determined as needed, for example, 8 bits, 16 bits and 32 bits, etc.

In this way, through the method of the disclosure, the information not perceived by the human eyes may be embedded into the encoding information (the variable code such as the two-dimensional code or the fixed code) using the frequency domain and spatial domain transformation, the counterfeiting difficulty is extremely large, the cost is high, and the anti-counterfeiting purpose is achieved; and furthermore, the printing cost is not increased, thereby being beneficial to wide promotion and application.

As a preferable scheme of the disclosure, after the embedded information is overlaid into the printed file in need of the variable code or the fixed code using the spatial processing method and is printed out, the embedded information is extracted out from the collected printed encoding information so as to determine whether surface information of the encoding information is dependable, wherein that "the embedded information is extracted out from the collected printed encoding information so as to determine whether the surface information of the encoding information is dependable" specifically is as follows: first of all, the image information of the printed encoding information is collected, and the gray transformation and the frequency domain transformation are performed on the image information in sequence; and then, the embedded information is extracted from the image information according to a certain rule. Specifically, it includes the following steps (as shown in FIG. 2).

In step b1, the image information B2 of the printed encoding information is collected, for examples, the image information of the printed encoding information is collected by means of photographing or scanning, etc.

In step b2, the gray transformation is performed on the obtained RGB image information B2 to obtain image information GB2 after the gray transformation, for example, image information $GB2=0.299R+0.587G+0.114B$.

In step b3, the frequency domain transformation is performed on the image information GB2 after the gray transformation to obtain an amplitude ampGB2.

In step b4, the amplitude ampGB2 is compared with an amplitude ampG in the database to obtain embedded information Wx having m bits in total, wherein the information of an ith bit is as follows:

when ampGB2 (i)>ampG (i)>=0, Wx (i)=1;
when ampGB2 (i)>ampG (i)<0, Wx (i)=0.

In step b5, the embedded information Wx is compared with embedded information W in the database so as to determine whether the surface information of the encoding information is dependable. When the embedded information Wx is consistent with the embedded information W in the database, it is determined that the information W is obtained by extracting. When the embedded information Wx cannot be read, it is indicated that the embedded information is lost, and the image information (two-dimensional code) of the printed encoding information may be no longer completely dependable.

In step b6, two-dimensional code reading is performed on the obtained RGB image information B2 or the image information GB2 after the gray transformation, and a comparison is made with two-dimensional code information in the database so as to determine whether the two-dimensional code information is falsified or is dependable.

In this way, the undependable printed encoding information is excluded effectively, further ensuring the dependability of the encoding information of a product.

In addition, before the gray transformation is performed on the obtained RGB image information B2, the image information B2 is further preprocessed (step b7); that is, according to a two-dimensional code of the image information B2, a point is positioned so as to determine a correction parameter (parameter such as a rotation and a multiple ratio) and then finish image correction. Therefore, the extraction accuracy of the embedded information in the image information of the printed encoding information is improved.

Figure 3:
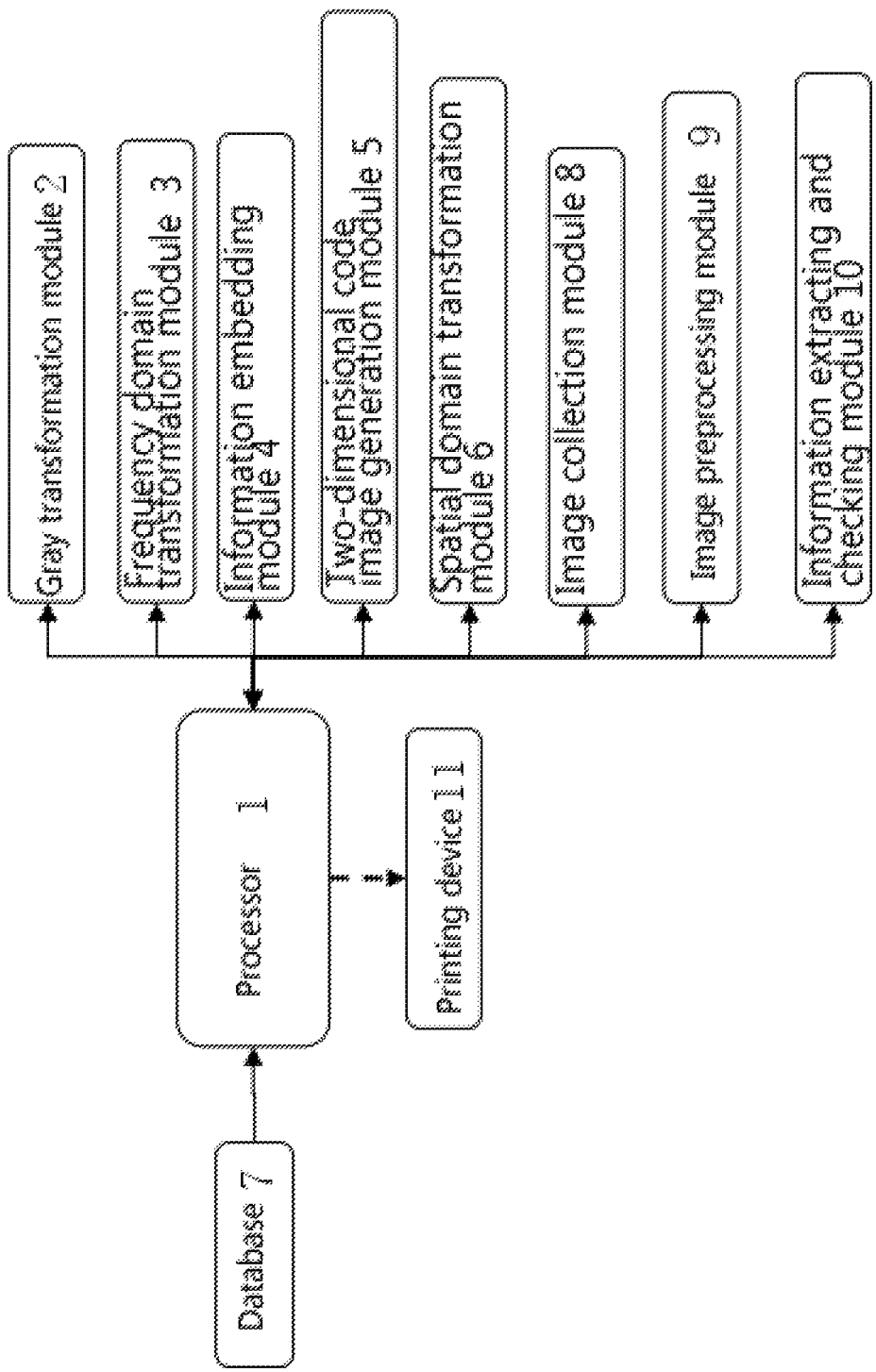
FIG. 3 is a structure and principle diagram of an embodiment of a system for embedding information into encoding information of the disclosure.

As shown in FIG. 3, the embodiments of the disclosure further provide a system for embedding information into encoding information, including a processor 1, a gray transformation module 2, a frequency domain transformation module 3, an information embedding module 4, a two-dimensional code image generation module 5, a spatial domain transformation module 6, a database 7, an image collection module 8, an image preprocessing module 9 and a printing device 11, wherein the gray transformation module 2 is mainly configured to perform gray transformation on an RGB or CMY or CMKY virtual image A or RGB image information B2 to obtain an image G or image information GB2 after the gray transformation; the frequency domain transformation module 3 is mainly configured to perform frequency domain transformation on the image G or the image information GB2 after the gray transformation to obtain an amplitude portion: ampG or ampGB2; the information embedding module 4 is mainly configured to embed embedded information into the amplitude ampG after the frequency domain transformation according to a rule; the two-dimensional code image generation module 5 is mainly configured to generate a two-dimensional code for given information, the two-dimensional code being a black-white two-dimensional code or a color two-dimensional code, and convert the two-dimensional code into image information B having a needed resolution; the spatial domain transformation module 6 is mainly configured to perform frequency domain inverse transformation to obtain an gray image G' of the embedded information, calculate a difference W' between the G' and the G, and perform spatial domain processing on the difference W' to embed into the image information B that needs to be embedded actually to obtain image information B' of the embedded information; the database 7 is mainly configured to store the embedded information, the information corresponding to the two-dimensional code, and the amplitude ampG of the gray image G after the frequency domain transformation; the image collection module 8 is mainly configured to collect the image information B2 of the printed encoding information; the image preprocessing module 9 is mainly configured to preprocess the image information B2 and then finish image correction to obtain a corrected image B2'; the information extracting and checking module 10 is mainly configured to perform information extraction and proofreading on the corrected image information B2', and check with the embedded information in the database; and the gray transformation module 2, the frequency domain transformation module 3, the information embedding module 4, the two-dimensional code image generation module 5, the spatial domain transformation module 6, the database 7, the image collection module 8, the image preprocessing module 9, the information extracting and checking module 10 and the printing device 11 all are conducted and are connected with the processor 1.

The above are preferable embodiments of the disclosure. It should be noted that those of ordinary skill in the art may make various improvements and alternations to the disclosure without departing from the principle of the disclosure and all of these alternations and improvements are covered by the scope of protection of the disclosure.

What is claimed is:

1. A method for determining whether printed encoding information is falsified, comprising:
    performing a gray transformation on a Red-Green-Blue (RGB) image, a Cyan-Magenta-Yellow (CMY) image or a virtual image to obtain a gray image G after the gray transformation;
    performing a frequency domain transformation on the gray image G after the gray transformation to obtain an amplitude;
    embedding an information into the amplitude after the frequency domain transformation according to a rule;
    performing a frequency domain inverse transformation to obtain a gray image G' of the information embedded, and calculating a difference between the gray image G' and the gray image G;
    generating a two-dimensional code, the two-dimensional code being a black-white two-dimensional code or a color two-dimensional code, and converting the two-dimensional code into an image information B;
    performing a spatial domain processing on the difference, embedding into the image information B that needs to be embedded actually to obtain an image information B' of the information embedded, and outputting the image information B' to a digital printer to print;
    after the image information B' is printed out, extracting the information embedded out from the printed information so as to determine whether surface information of the printed information is falsified.

2. The method according to claim 1, wherein the step of embedding an information into the amplitude after the frequency domain transformation according to a rule specifically comprises two steps: (1) performing the frequency domain transformation on the image G after the gray transformation to obtain the amplitude; and (2) when the information embedded is m-bit W, and information W (i) at an ith bit is 0 or 1, i=1, 2, ..., m, each bit of the information W (i) is embedded into the amplitude of the gray image G after the frequency domain transformation according to the following rule:

ampG (i)'=ampG (i)+X, when the W (i) is 1;
ampG (i)'=ampG (i)−X, when the W (i) is 0;
where X is a given positive real number and i is the ith bit of the information embedded;
alternatively,
ampG (i)'=ampG (i)*(1+a), when the W (i) is 1;
ampG (i)'=ampG (i)*(1−a), when the W (i) is 0;
where a is a given positive real number less than 1 and i is the ith bit of the information embedded.

3. The method according to claim 1, wherein the step of extracting the information embedded out from the printed information so as to determine whether surface information of the printed information is falsified comprises the following steps:

obtaining an image information B2 of the printed information;
performing the gray transformation on the image information B2 to obtain an image information GB2 after the gray transformation;
performing the frequency domain transformation on the image information GB2 after the gray transformation to obtain an amplitude ampGB2;
comparing the amplitude ampGB2 with an amplitude ampG in a database to obtain embedded information Wx having m bits in total, wherein the information of the ith bit is as follows:
when ampGB2 (i)>ampG (i)>=0, Wx (i)=1;
when ampGB2 (i)>ampG (i)<0, Wx (i)=0;
comparing the embedded information Wx having the m bits with embedded information W having m bits in the database so as to determine whether the surface information of the printed information is falsified; and
performing two-dimensional code reading on the image information B2 or the image information GB2 after the gray transformation, and comparing with two-dimensional code information in the database so as to determine whether the two-dimensional code read on the image information B2 or the image information GB2 is falsified.

4. The method according to claim 3, further comprising: before the gray transformation is performed on the image information B2, preprocessing the image information B2.

5. The method according to claim 3, wherein a sequence of 0 and 1 for the m bits of the embedded information W is composed of information by direct conversion, or is composed of encrypted or additionally verified codes, or is combined with the two-dimensional code information.

* * * * *